(12) United States Patent
Cheng et al.

(10) Patent No.: US 7,887,199 B2
(45) Date of Patent: Feb. 15, 2011

(54) PROJECTOR FRAME

(75) Inventors: Sheng-Hsiung Cheng, Taipei Hsien (TW); Yao-Wen Hsu, Taipei Hsien (TW)

(73) Assignee: Aopen Inc., Hsichih, New Taipei (TW)

( * ) Notice: Subject to any disclaimer, the term of this patent is extended or adjusted under 35 U.S.C. 154(b) by 0 days.

(21) Appl. No.: 12/007,149

(22) Filed: Jan. 7, 2008

(65) Prior Publication Data

US 2010/0214539 A1    Aug. 26, 2010

(30) Foreign Application Priority Data

Aug. 16, 2007    (TW) .............................. 96213577 U

(51) Int. Cl.
*G03B 21/28*    (2006.01)
*G03B 21/14*    (2006.01)

(52) U.S. Cl. ......................................... 353/98; 353/119

(58) Field of Classification Search .................. 353/98, 353/119
See application file for complete search history.

(56) References Cited

U.S. PATENT DOCUMENTS 4,994,946 A * 2/1991 NakaMats ................... 362/282

* cited by examiner

*Primary Examiner*—Thanh X Luu

(57) ABSTRACT

A dual purpose projectable projector frame comprises a main frame body, a upper end thereof is disposed with a first through hole; the first through hole being surrounded with two side walls; two side walls are pivotally coupled to two sides of a reflector; a projecting image emitted from a projection head is projected to the front or the back of the main frame body by adjusting an angle of a reflection face of the reflector reflecting light projected from a projector to allow the projector to have a dual purpose function of a general projection and capability of projecting an image onto a table face to enable the application of the projector to be broader.

11 Claims, 3 Drawing Sheets

PROJECTOR FRAME

BACKGROUND OF THE INVENTION

1. Field of the Invention

The present invention relates to a frame coupled to a projector, and more particularly to a frame capable of assisting a projector to carry out projection forward or rearward.

2. Description of Related Art

As the price of a projector becomes cheaper, application thereof is more valued; no matter what it is a business negotiation, education market or home entertainment, the use of a projector can be seen everywhere. The volume of a general mini-size portable projector is rather light and handy. The current technology allows a user to carry out immediate specific uses such as revision and replenishment besides a usual function of projection onto a canvas screen or a wall surface.

A general setup of a projector can be divided into a variety of setup ways such as front face front projection, back face front projection, hanging type front projection and hanging type rear projection. Taiwan Patent No. 534412 discloses an adjustable supporting frame for a projector; it comprises a base and a supporting seat disposed at a front side thereof. A fixing seat is disposed at a rear side of the base, and the supporting seat and the fixing seat are respectively coupled to left and right sides of the base through four vertical rods, in which a plurality of vertically arranged adjustable holes are respectively disposed on the four vertical rods. Furthermore, the plurality of adjusting holes on the two sides allow a screw to be passed through to fix an adjusting plate, a curved groove is disposed on the adjusting plate, and a pivoting hole is disposed above a center of the curved groove on the adjusting plate to match a pivoting screw to fix a fixing frame and a reflection mirror of a projector to allow angles of pitch of both the projector and the reflection mirror to be adjusted to response to a different type of projection system design.

Although the projector supporting frame mentioned above can adjust a projecting direction of a projector, a structure thereof is very complex, occupies a lot of space and is unable to project an image onto a table face to enable a user to use images projected on table surface to further replenish or revise data concerning the image.

SUMMARY OF THE INVENTION

For elevating the practical function of a projector frame, the present invention is proposed.

The main object of the present invention is to provide a projector frame, used for coupling to a projector to allow the projector to be provided with a double-function of a general projection and projecting images on a table.

Another object of the present invention is to provide a projector frame for double-function projection, a structure thereof is simple, the production cost is low, and it is convenient to be coupled to a market available portable projector to allow the application of a projector to be broader.

For attaining to the objects mentioned above, the present invention a projector frame, comprising:

a main frame body, disposed with a connection part and used for coupling to a projector to allow a projection head of the projector to face upward; a upper end of the main frame body being disposed with a first through hole; the first through hole being surrounded with two side walls;

a reflector, provided with two sides and a reflection face, the reflection face being used for reflecting projecting light of the projector;

wherein the two sides of the first through hole are respectively pivotally coupled to two sides of the reflector through a shaft thereby projecting a projected image projected out from the projection head to the front or the back of the main frame body by adjusting an angle of the reflector at which the light of the projector reflected is reflected.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
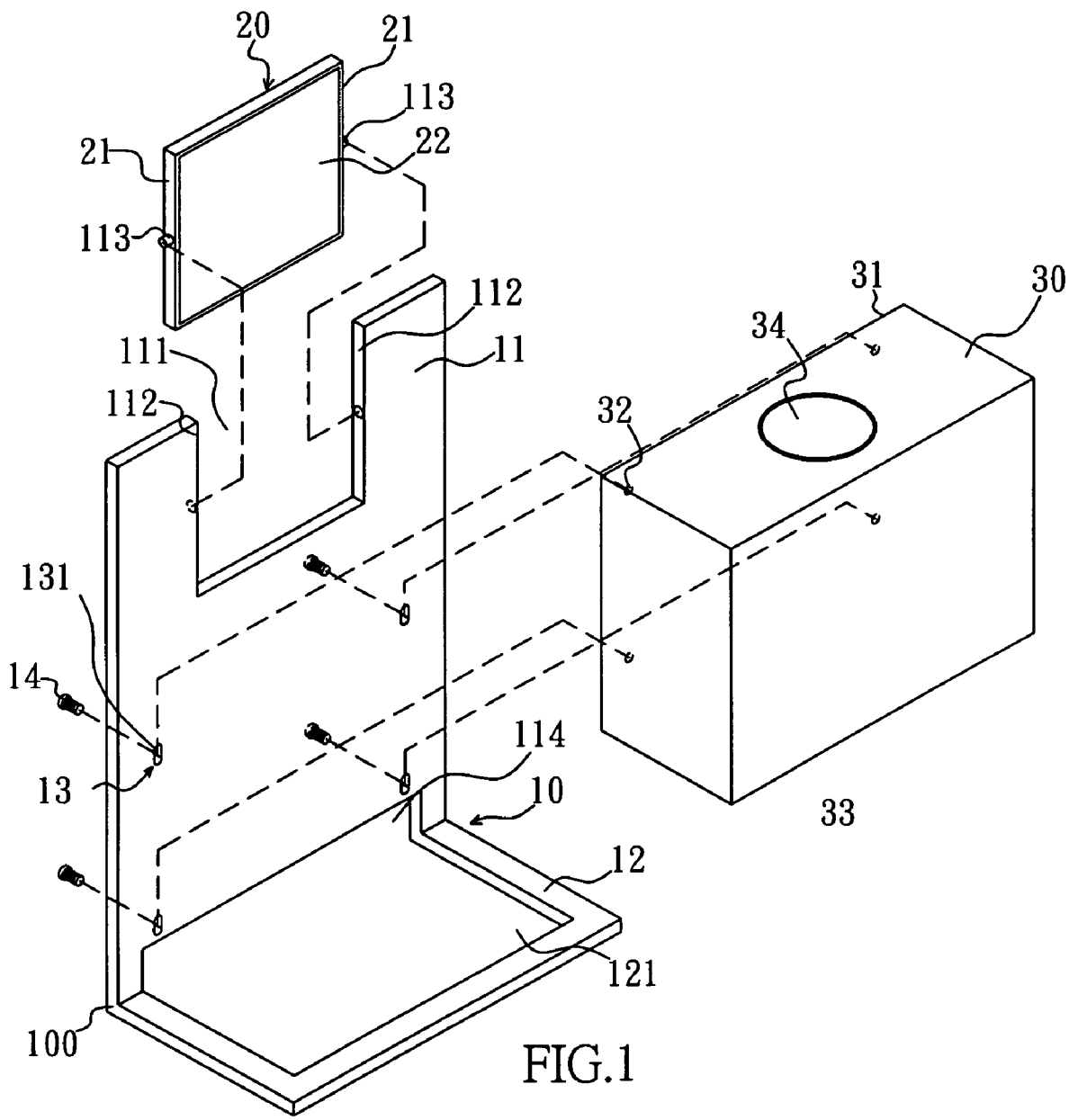
FIG. 1 is an exploded view of a projector frame of the present invention.
Figure 2:
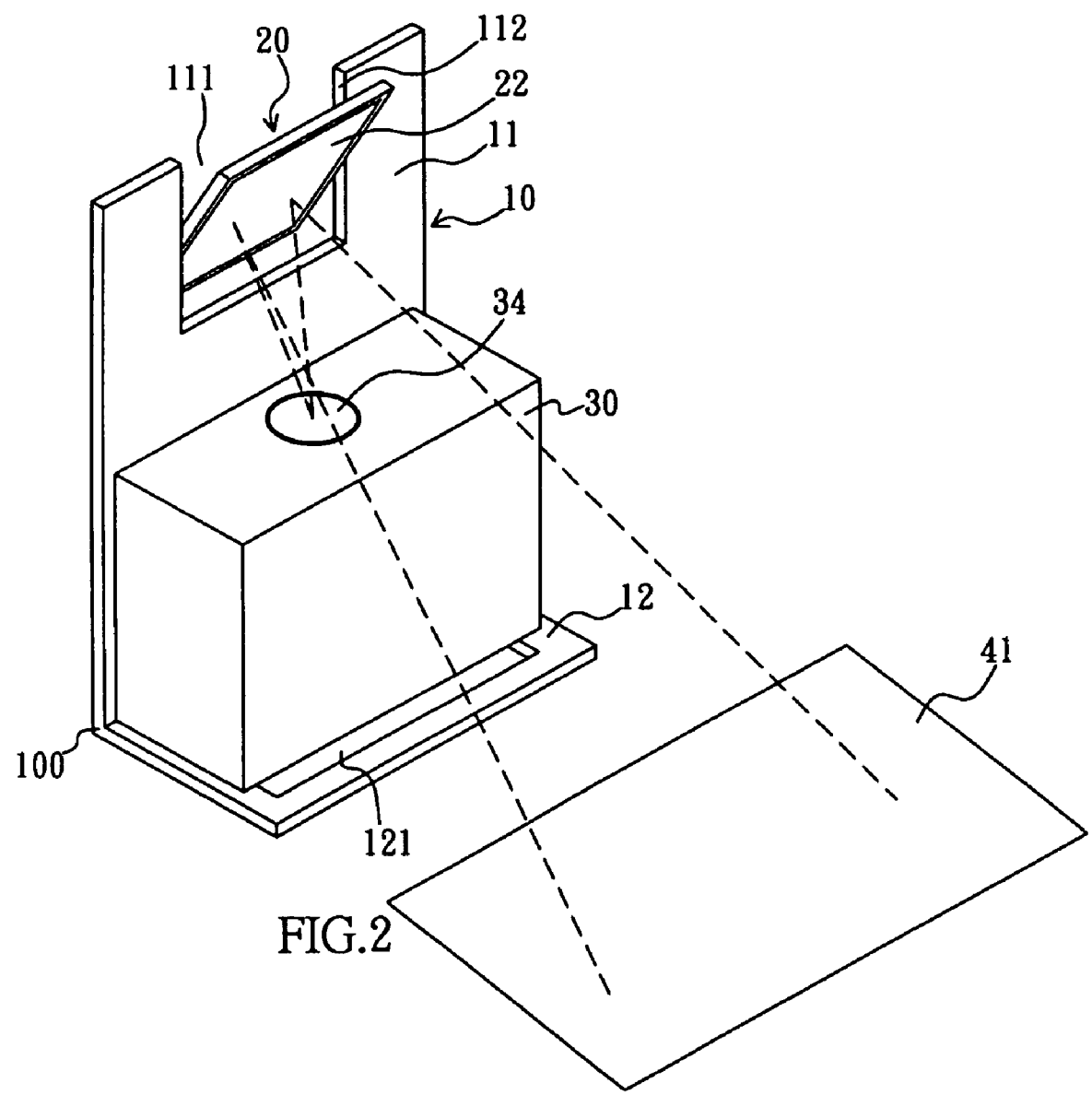
FIG. 2 is a schematic view of a projector frame of the present invention in a first use state.

Please refer to FIGS. 1 and 2. A projector frame of the present invention comprises a main frame body 10 and a reflector 20, in which the reflector 20 may comprises a light reflexible glass face or acrylic face. The main frame body 10 is disposed with a vertical supporting frame 11 and a horizontal seat 12. The vertical supporting frame 11 and the horizontal seat 12 are perpendicular to each other in a preferred embodiment and formed by bending an identical plate 100 90 degrees. The vertical supporting frame 11 and the horizontal seat 12 may also be pivotally coupled to each other and then formed a mutually perpendicular state while being used. A first through hole 111 is disposed on a upper end of the vertical supporting frame 11. Two side walls 112 are respectively pivotally coupled to two sides 21 of the reflector 20 through a shaft 113 to allow the reflector 20 to take the two shafts 113 as a center to rotate an angle; the vertical supporting frame 11 is further disposed with a connection part 13, e.g. a plurality of screw holes 131, to allow a plurality of screws 14 to be respectively passed through the screw holes 131 to screw in screw holes 32 on a bottom 31 of a projector 30 to enable the bottom 31 of the projector 30 to be fixedly coupled to the front of the vertical supporting frame 11 an in the meantime, the back 33 of the projector 30 is mounted on a upper side of the horizontal seat 12, and a projection head 34 of the projector 30 faces upward. A second through hole 121 is disposed on the horizontal seat 12, and a third through hole 114 is disposed on a lower end of the vertical supporting frame 11. The second through hole 114 and the third through hole 121 are connected to each other, and used as a wire inserting and withdrawing zone of the projector 30 convenient for a user to insert or withdraw a wire. The horizontal seat 12 is used for placing on a table face to allow the vertical supporting frame 11 to be erected on the table face, and further to allow the projection head 34 of the projector 30 to face upward to project light onto the reflection face 22 of the reflector 20 as FIG. 2 shows. When a user wants to insert or withdraw the wire of the projector 30, he may easily turn the main frame body 10 over to cause the vertical supporting frame 11 to be placed on the table face, and the horizontal seat 12 is then caused to be perpendicular to the table face and not to be stayed on the table face so that the user can inset or withdraw the wire conveniently.

Figure 3:
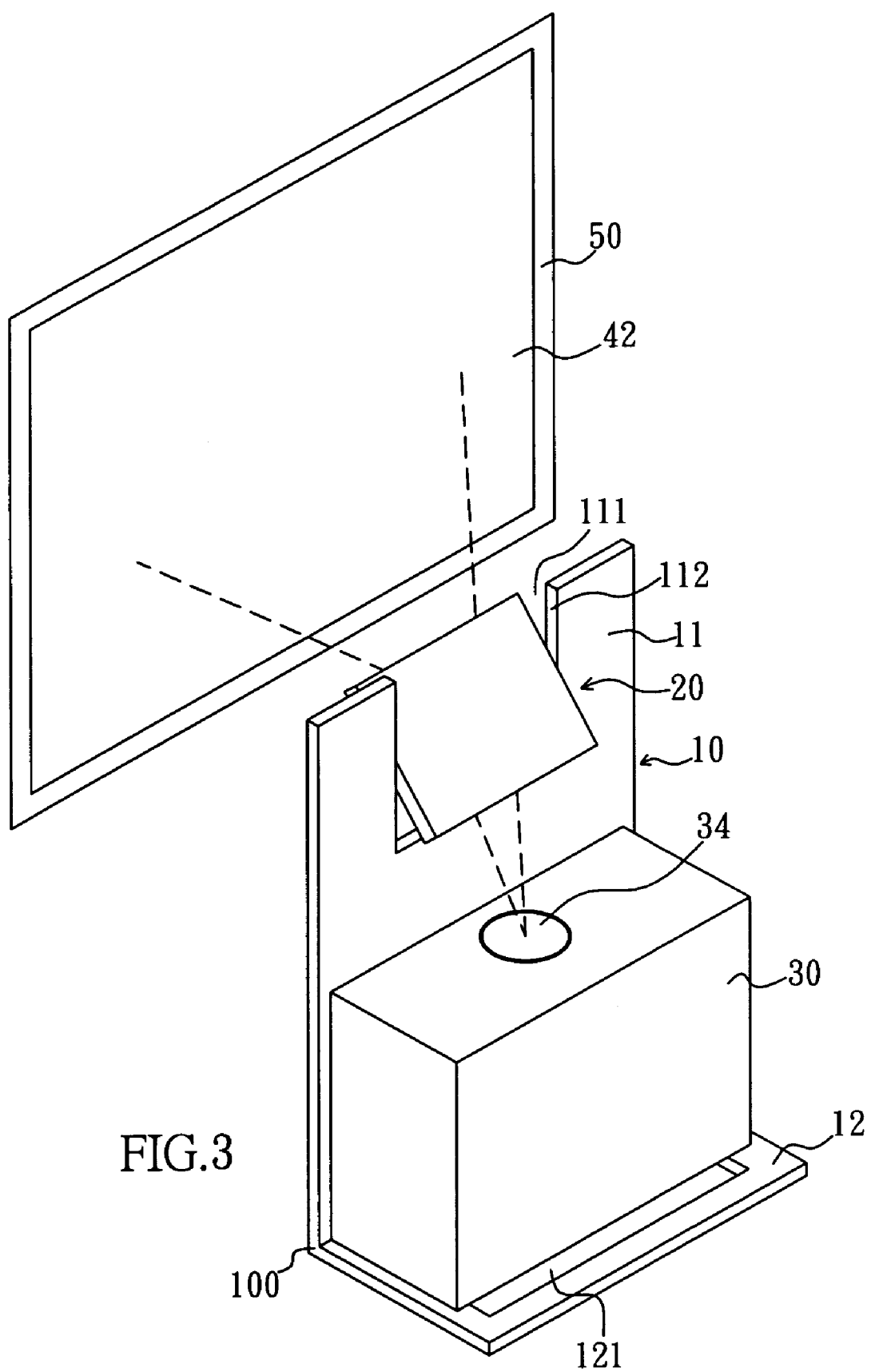
FIG. 3 is a schematic view of a projector frame of the present invention in a second use state.

Please refer to FIGS. 2 and 3. One aspect of the projector frame for double-function projection of the present invention mainly is to dispose the first through hole 111 on the upper end of the main frame body 10; two side walls 112 are respectively pivotally coupled to the two sides of the reflector 20 to allow the reflector 20 to be rotated with a proper angle relatively to the main frame body 10. Furthermore, the projection head 34 is coupled to the main frame body 10 and the projector 30 thereof faces upward. When the main frame body 10 is placed on the table face, the light emitted from the projection head 34 may be projected onto the reflection face 22 of the reflector 20, and a projecting image 41 may be projected onto the table face in front of the main frame body 10 as FIG. 2 shows or a projecting image 42 is allowed to project onto a screen 50 or a wall at the rear of the main frame body 10 as FIG. 3 shows by adjusting the angle of the reflection face 11 at which the projecting light of the projector 30 is reflected.

The structure of the dual purpose projectable projector frame of the present invention is simple such that the production cost can be reduced; it is convenient to be coupled to a market available portable projector thereby allowing the projector to have a dual purpose function of a general projection and capability of projecting an image onto a table face to enable the application of the projector to broader.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector frame comprising:
a main frame body being disposed with a connection part for coupling to a projector and allowing a projection head of said projector to face upward, a first through hole being disposed on an upper end of said main frame body and being surrounded with two side walls;
a reflector being provided with two sides and a reflection face, said reflection face being used for reflecting light projected from said projector;
wherein said two side walls are pivotally coupled to said two sides of said reflector through a shaft to project a projecting image emitted from said projection head to the front or the back of said main frame body by adjusting an angle of said reflection face at which light projected from said projector is reflected;
wherein a vertical supporting frame and a horizontal seat are disposed on said main frame body; an upper end of said vertical supporting frame is disposed with said first through hole.

2. The projector frame according to claim 1, wherein said vertical supporting frame is disposed with said connection part; said connection part is used for coupling to a bottom of said projector to cause said bottom of said projector to be fixedly coupled to the front of said vertical supporting frame.

3. The projector frame according to claim 2, wherein said vertical supporting frame and said horizontal seat are perpendicular to each other.

4. The projector frame according to claim 3, wherein a upper side of said horizontal seat is used for bearing the back of said projector.

5. The projector frame according to claim 4, wherein said vertical supporting frame and said horizontal seat are formed by bending an identical plate 90 degrees.

6. The projector frame according to claim 5, wherein said horizontal seat is disposed with a second through hole used for a wire inserting and withdrawing zone of said projector to be convenient for a user to insert or withdraw a wire.

7. The projector frame according to claim 6, wherein a third through hole is disposed on a lower end of said vertical supporting frame, said third through hole and said second through hole are communicated with each other.

8. The projector frame according to claim 7, wherein said connection part is a plurality of screw holes used for allowing a plurality of screws to be respectively passed through screw holes to screw in screw holes on a bottom of said projector.

9. The projector frame according to claim 1, wherein said horizontal seat is disposed with a second through hole used for a wire inserting and withdrawing zone of said projector to be convenient for a user to insert or withdraw a wire.

10. The projector frame according to claim 9, wherein a third through hole is disposed on a lower end of said vertical supporting frame, said third through hole and said second through hole are communicated with each other.

11. The projector frame according to claim 10, wherein said connection part is a plurality of screw holes used for allowing a plurality of screws to be respectively passed through screw holes to screw in screw holes on a bottom of said projector.

* * * * *